United States Patent [19]

Fisher

[11] 4,350,984
[45] Sep. 21, 1982

[54] METHOD OF POSITION FIXING ACTIVE SOURCES UTILIZING DIFFERENTIAL DOPPLER

[75] Inventor: Robert H. Fisher, Bowie, Md.

[73] Assignee: The United States of America as represented by the Director of the National Security Agency, Washington, D.C.

[21] Appl. No.: 831,279

[22] Filed: Jun. 5, 1969

[51] Int. Cl.³ .............................................. G01S 3/02
[52] U.S. Cl. ............................ 343/112 R; 343/112 C
[58] Field of Search ........................ 343/112 R, 112 C

[56] References Cited

U.S. PATENT DOCUMENTS

| 2,968,034 | 1/1961 | Cafarelli, Jr. | 343/112 |
|---|---|---|---|
| 3,155,937 | 11/1964 | Grimm et al. | 343/112 |
| 3,242,487 | 3/1966 | Hammack | 343/112 |
| 3,445,847 | 5/1969 | Hammack | 343/112 |
| 3,706,096 | 12/1972 | Hammack | 343/112 R |

*Primary Examiner*—S. C. Buczinski
*Attorney, Agent, or Firm*—John R. Utermohle; Thomas O. Maser

[57] ABSTRACT

A method of position fixing an active transmitter source. At least two passive receivers are utilized to position fix at least one active transmitter source by obtaining the difference of the doppler frequencies received at the passive receivers, the receivers being tuned to the transmitter frequency. This differential doppler frequency is processed together with navigational information relative to the passive receiver positions at selected measurement intervals along a given measurement path of receiver movement, in order to fix the unknown position of the active transmitter source.

9 Claims, 8 Drawing Figures

METHOD OF POSITION FIXING ACTIVE SOURCES UTILIZING DIFFERENTIAL DOPPLER

BACKGROUND OF THE INVENTION

1. Field of the Invention

The present invention is a method of position fixing, more particularly it is a method of position fixing an active transmitter source utilizing differential doppler.

2. Prior Art

Most prior art position fixing schemes can be categorized into three types of systems; the time-difference-of-arrival, hyperbolic system; the single-doppler-frequency system; and the phase-front-line-of-position system. The time-difference-of-arrival, hyperbolic system requires a distinguishing property in modulation, although stability of the signal emanating from the source to be located is not a requisite. The differential doppler technique of the present invention requires no modulation; however, this technique can operate on a signal with a very low band width, such as a single sinusoidal frequency, if desired. The differential-doppler technique of the present invention does not depend on modulation on the carrier, whereas the time-difference-of-arrival technique does.

Prior art single-doppler-frequency systems require high stability transmissions, although they do not require modulation. The differential doppler technique of the present invention does not require this stability as the frequency errors due to instability are minimized in applying the differential doppler technique of the present invention. The differential doppler technique of the present invention requires neither stability nor modulation, depending only on the change in frequency of the basic carrier, and not on the modulation on the carrier, in order to position fix an active transmitter source.

Differential doppler range techniques, such as disclosed in U.S. Pat. No. 3,397,398 issued to O. B. Dutton et al., utilize an active system-passive source in order to accomplish differential doppler range measurement. Two CW signals, having different frequencies, are transmitted in order to obtain two doppler frequencies which are phase different. This technique is a return measurement system utilizing cooperative transmitters, which does not have the utility of the technique of the present invention. The source in the present invention could be unstable, and the differential doppler range technique could not be utilized to locate such an unstable transmitter. The differential doppler range technique only requires a return for range, and does not utilize an external source of emanation in order to locate this source; rather the system locates a reflecting body, not a transmitter. Doppler range measuring systems utilize an active receiver, which transmits the signal it desires to receive and a passive reflecting body; rather than a passive receiver and an active source, as is in the present invention.

The differential doppler technique of the present invention offers the advantage of placing no restrictions on massive movement of the passive receivers, nor on antenna structural size or placement. The only requirement is that the received signals are detectable. A transmitter position fix may be calculated by data collected during a maximum of three contiguous measurement intervals, and these measurement intervals need not occur directly over the active transmitter source to be located, nor within close proximity to it, as long as the received signals are detectable.

SUMMARY OF THE INVENTION

An object of the present invention is to provide a new and improved method of position fixing an active transmitter source.

Another object of the present invention is to provide a new and improved method of position fixing an active transmitter source which overcomes the disadvantages of the prior art.

A still further object of the present invention is to provide a new and improved method of position fixing an unknown active transmitter source utilizing differential doppler.

With these objects in view a method of position fixing an active transmitter source may include the steps of moving at least two passive receivers along a given measurement path of receiver movement; obtaining navigational information during selected measurement intervals along the measurement path of movement, the navigational information indicating the positions of the receivers during the selected intervals; receiving doppler frequency shifts of the active source transmitter frequency at the passive receivers during the selected intervals; obtaining the difference of the doppler frequency shifts received during the selected intervals, the differential doppler being a constant for each point of measurement during the selected interval; and processing the obtained navigational information and the received differential doppler frequency shifts to obtain the position of the active source.

Other objects and many of the attendant advantages of this invention will be readily appreciated as the invention becomes better understood by reference to the description below, when taken in conjunction with the following drawings wherein.

THEORY

Figure 1:
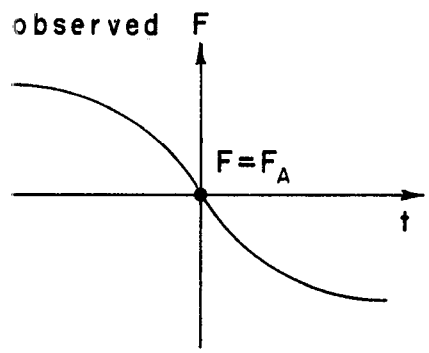
FIG. 1 is a graphic illustration of a standard doppler curve.

The method of the present invention make use of the difference in the doppler shift of the received frequency observed in each of at least two passive receivers moving in the vicinity of an active transmitter source whose location is unknown. In desiring to locate the unknown position of the active transmitter source, both passive receivers are tuned for the signal of the transmitter to be located. The method of the present invention is equally applicable to a multiplicity of active transmitter sources having unknown locations, in which case the method of the present invention could be performed sequentially on a time-shared basis.

For purposes of illustration, two passive receivers will be assumed, and these receivers will be separately located on flying platforms, although the technique has application to any type of moving platform The location of the two aircraft, hence the two passive receivers, with respect to each other, is not important as the accumulation of doppler cycles from one point to another is a line integral doppler frequency; however, the minimum separation between receivers should be such that each receiver will experience a different doppler shift, in order to employ the technique of the present invention to best advantage. If the separation between the two passive receivers is comparable to the distance to the transmitter, then each receiver will experience a significantly different doppler shift; for example, a 10 to 15 mile separation within a thirty mile radius to the active transmitter source to be located.

Differencing of the two doppler shifts can be accomplished by phase detecting the intermediate frequency of one receiver with the intermediate frequency of the second receiver. This difference in doppler frequency, or differential doppler, as it will be hereinafter referred to, is then integrated with respect to time. To perform the position fixing computation for the active transmitter source, there should be a minimum of two periods of cycle accumulations if one of the coordinates is known, such as elevation, or three if none is known. The beginning and end of each period are the pertinent points of measurement. The separation between the two receivers need not rigidly be maintained as long as it remains significant with respect to the distance to the active transmitter source to be located.

The location of an active transmitter source, by the differential doppler method of the present invention, requires at least three doppler measurements in order to fix the three coordinates ($X_0$, $Y_0$, $Z_0$) of the transmitter, assuming a rectangular cartesian coordinate system; although this technique is applicable to any coordinate system. Each measurement must also include navigational information relative to the position of the two passive receivers at the beginning and end of each of the measurement intervals. In all, we need twenty-eight parameters in order to fix the position of the transmitter, twenty-four of these parameters being the navigational information, the other four known parameters being $\lambda_t$, d the wave length of the transmitter frequency, and the integral of $F_d$, the differential doppler frequency, over a given time period, for each interval.

Figure 7:
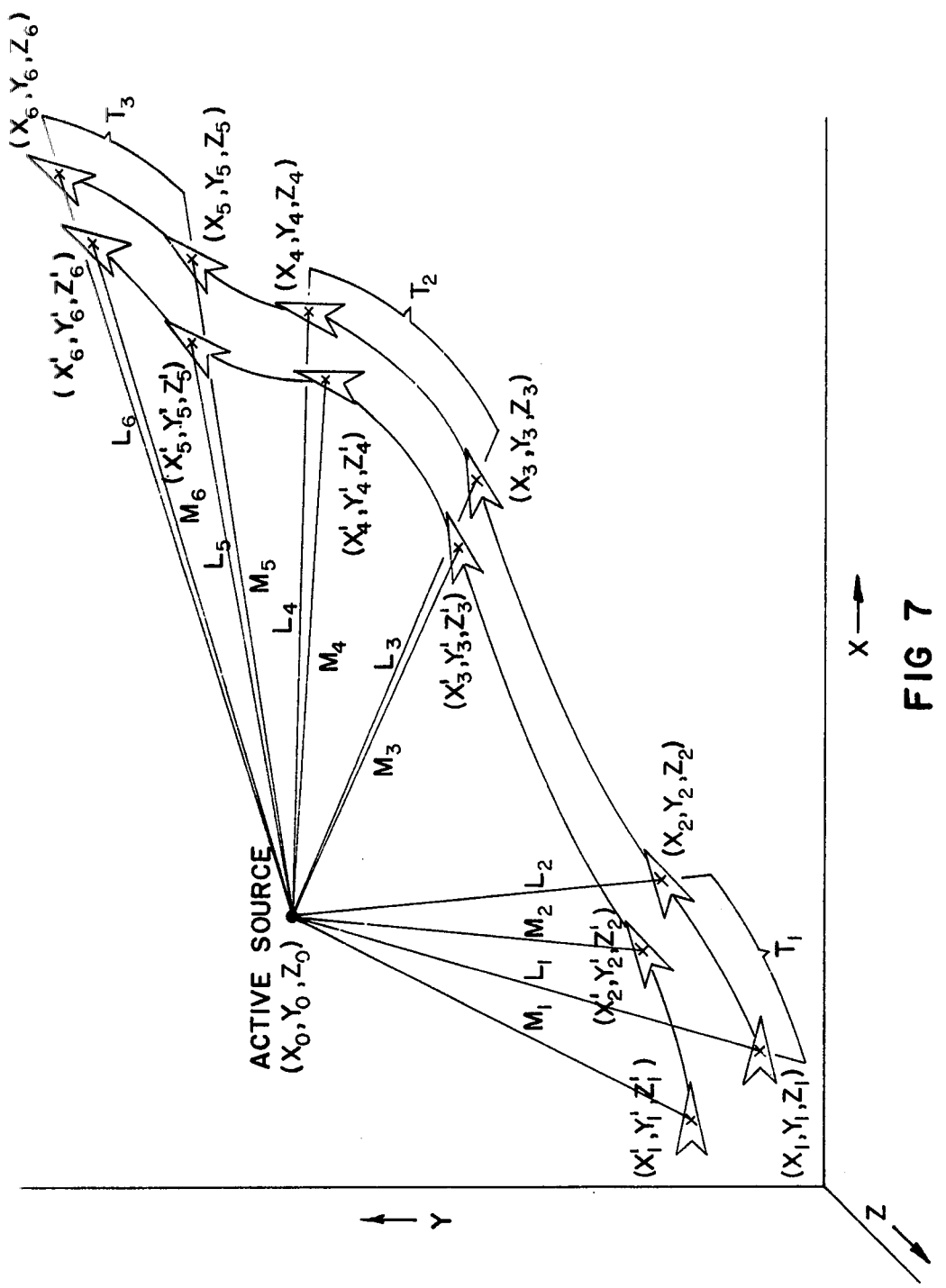

The differential doppler equations, which may be solved to locate the unknown position of active transmitter source may be derived in the following manner, with reference to FIG. 7 which is a graphic illustration of the differential doppler geometry involved:

For the time period between $t_1$ and $t_2$,

1.

$$\int_{t_1}^{t_2} F_d dt = \int_{t_1}^{t_2} F_1 dt - \int_{t_1}^{t_2} F_2 dt$$

where,
$F_1$ = frequency received by aircraft one
$F_2$ = frequency received by aircraft two $$\int_{t_1}^{t_2} F_d dt$$

= integral of the difference frequency as a function of time and, $$F_1 = F_t \left( 1 \pm \frac{V_1}{c} \cos\alpha \right)$$

$$F_2 = F_t \left( 1 \pm \frac{V_2}{c} \cos\beta \right)$$

where,
$F_t$ = transmitted frequency not considered a function of time
$V_{1(2)}$ = velocity of aircraft 1(2)
$\alpha$ = angle between track of aircraft one and the transmitter
$\beta$ = angle between track of aircraft two and the transmitter

2.

$$\int_{t_1}^{t_2} F_d dt = \int_{t_1}^{t_2} \left[ F_t \left( 1 \pm \frac{V_1}{c} \cos\alpha \right) \right] dt - \int_{t_1}^{t_2} \left[ F_t \left( 1 \pm \frac{V_2}{c} \cos\beta \right) \right] dt$$

3.

$$\int_{t_1}^{t_2} F_d dt = \int_{t_1}^{t_2} F_t dt + \int_{t_1}^{t_2} \frac{F_t V_1}{c} \cos\alpha \, dt - \int_{t_1}^{t_2} F_t dt - \int_{t_1}^{t_2} \frac{F_t V_2}{c} \cos\beta \, dt$$

4.

$$\int_{t_1}^{t_2} F_d dt = \int_{t_1}^{t_2} \frac{F_t V_1}{c} \cos\alpha \, dt - \int_{t_1}^{t_2} \frac{F_t V_2}{c} \cos\beta \, dt$$

5.

$$\int_{t_1}^{t_2} F_d dt = \frac{F_t}{c} \left[ \int_{t_1}^{t_2} V_1 \cos\alpha \, dt - \int_{t_1}^{t_2} V_2 \cos\beta \, dt \right]$$

6. Let $L(t)$ be the distance from aircraft one to the transmitter and $M(t)$ be the distance from aircraft two to the transmitter then, $$V_1 \cos\alpha = \frac{dL}{dt}$$

$$V_2 \cos\beta = \frac{dM}{dt}$$

$$\frac{F_t}{c} = \frac{1}{\lambda_t}$$

$$\int_{t_1}^{t_2} F_d dt = \frac{1}{\lambda_t} \left[ \int_{t_1}^{t_2} dL - \int_{t_1}^{t_2} dM \right] =$$

$$\frac{1}{\lambda_t} [L_2 - L_1 - M_2 + M_1]$$

For the second time period between $t_3$ and $t_4$, $$\int_{t_3}^{t_4} F_d dt = \frac{1}{\lambda_t} [L_4 - L_3 - M_4 + M_3]$$

and for the third time period between $t_5$ and $t_6$, $$\int_{t_5}^{t_6} F_d dt = \frac{1}{\lambda_t} [L_6 - L_5 - M_6 + M_5].$$

Three separate distinct time intervals $t_1$-$t_2$, $t_3$-$t_4$ and $t_5$-$t_6$, have been chosen for purposes of illustration, although any combination yielding three discrete measurement intervals, such as $t_1$-$t_2$, $t_2$-$t_3$, and $t_3$-$t_4$ could be utilized to yield the necessary equations.

Now, if the position of each of the passive receivers is converted to an arbitrary X-Y-Z rectangular Cartesian coordinate system, the unknown location of the active transmitter source can be determined by solving the three following equations which take the transmitter location, $X_0$, $Y_0$, and $Z_0$ as the three unknowns.

Therefore, $L_1 = F(X_1, Y_1, Z_1)$ at $t_1$ $L_2 = F(X_2, Y_2, Z_2)$ at $t_2$ $L_3 = F(X_3, Y_3, Z_3)$ at $t_3$ $L_4 = F(X_4, Y_4, Z_4)$ at $t_4$ $L_5 = F(X_5, Y_5, Z_5)$ at $t_5$ $L_6 = F(X_6, Y_6, Z_6)$ at $t_6$ for the first passive receiver and $M_1 = F(X_1', Y_1', Z_1')$ at $t_1$ $M_2 = F(X_2', Y_2', Z_2')$ at $t_2$ $M_3 = F(X_3', Y_3', Z_3')$ at $t_3$ $M_4 = F(X_4', Y_4', Z_4')$ at $t_4$ $M_5 = F(X_5', Y_5', Z_5')$ at $t_5$ $M_6 = F(X_6', Y_6', Z_6')$ at $t_6$ for the second passive receiver
Then letting $$N_{12} = \lambda_t \int_{t_1}^{t_2} F_d dt,$$

the fade equation, or number of fades (cycles) of the signal between $t_1$ and $t_2$ and substituting yields $$N_{12} = \lambda_t \int_{t_1}^{t_2} F_d dt = L_2 - L_1 - M_2 + M_1$$

$$N_{12} = \sqrt{(X_2 - X_0)^2 + (Y_2 - Y_0)^2 + (Z_2 - Z_0)^2} -$$

$$\sqrt{(X_1 - X_0)^2 + (Y_1 - Y_0)^2 + (Z_1 - Z_0)^2} -$$

$$\sqrt{(X'_2 - X_0)^2 + (Y'_2 - Y_0)^2 + (Z'_2 - Z_0)^2} +$$

$$\sqrt{(X'_1 - X_0)^2 + (Y'_1 - Y_0)^2 + (Z'_1 - Z_0)^2}$$

Then letting $$N_{34} = \lambda_t \int_{t_3}^{t_4} F_d dt,$$

the fade equation for the interval $t_3$ to $t_4$, and substituting yields $$N_{34} = \lambda_t \int_{t_3}^{t_4} F_d dt =$$

$$\sqrt{(X_4 - X_0)^2 + (Y_4 - Y_0)^2 + (Z_4 - Z_0)^2} -$$

$$\sqrt{(X_3 - X_0)^2 + (Y_3 - Y_0)^2 + (Z_3 - Z_0)^2} -$$

$$\sqrt{(X'_4 - X_0)^2 + (Y'_4 - Y_0)^2 + (Z'_4 - Z_0)^2} +$$

$$\sqrt{(X'_3 - X_0)^2 + (Y'_3 - Y_0)^2 + (Z'_3 - Z_0)^2}$$

Then letting $$N_{56} = \lambda_t \int_{t_5}^{t_6} F_d dt,$$

the fade equation for the interval $t_5$ to $t_6$, and substituting yields $$N_{56} = \lambda_t \int_{t_5}^{t_6} F_d dt =$$

$$\sqrt{(X_6 - X_0)^2 + (Y_6 - Y_0)^2 + (Z_6 - Z_0)^2} -$$

$$\sqrt{(X_5 - X_0)^2 + (Y_5 - Y_0)^2 + (Z_5 - Z_0)^2} -$$

$$\sqrt{(X'_6 - X_0)^2 + (Y'_6 - Y_0)^2 + (Z'_6 - Z_0)^2} +$$

$$\sqrt{(X'_5 - X_0)^2 + (Y'_5 - Y_0)^2 + (Z'_5 - Z_0)^2}$$

METHOD

The method of the present invention makes use of the difference in the doppler frequency shifts of the received frequency observed in each of at least two passive receivers moving in the vicinity of the active transmitter source to be located. The actual path of movement of the passive receivers is irrelevant to the determination of the position of the active transmitters source, the only navigational information being pertinent being the location of the passive receiver at the instant a doppler measurement is taken.

Figure 8:
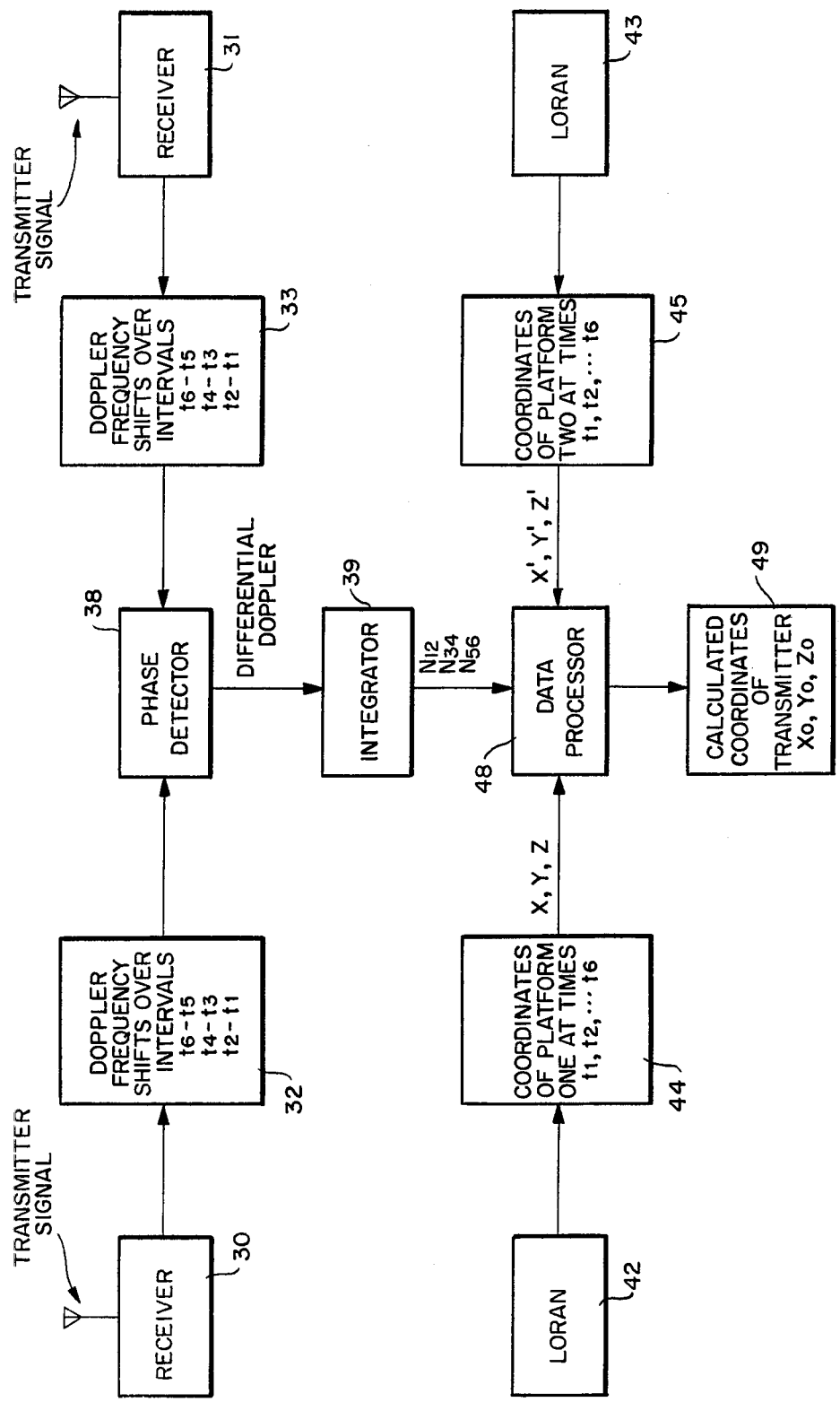
FIG. 8 is a diagrammatic representation of the claimed process.

FIG. 8 is a block diagram of an on-board position fixing apparatus capable of performing the method of my invention. It includes a LORAN 20 and a receiver 21, both of which are connected into a data processor 22. Each moving platform would have such an apparatus.

Figure 2:
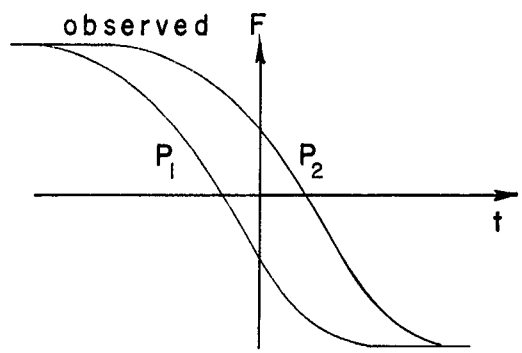
FIGS. 2 through 5 are graphic illustrations of the phenomena associated with the method of the present invention.
Figure 3:
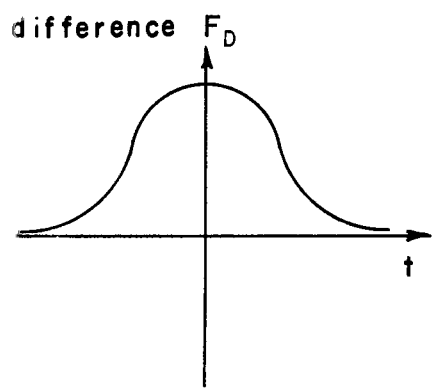
Figure 4:
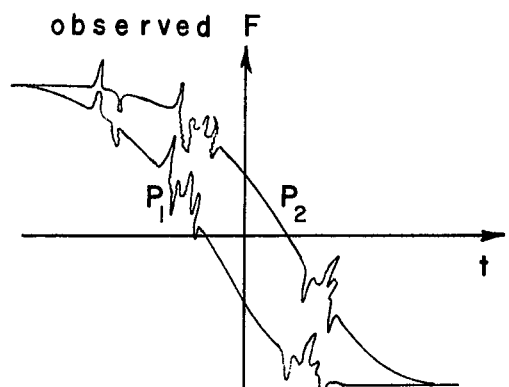
Figure 5:
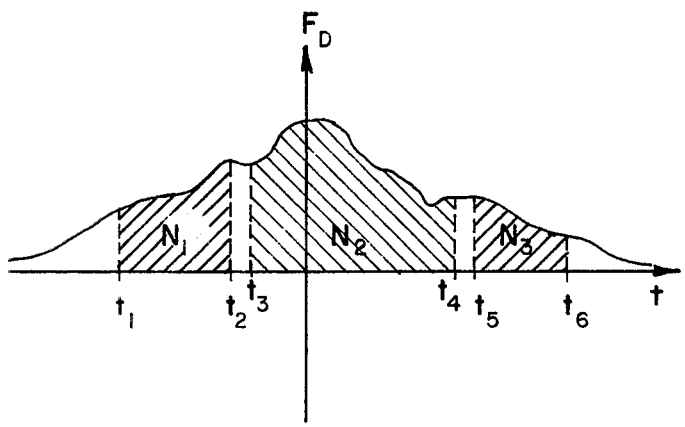
Figure 6:
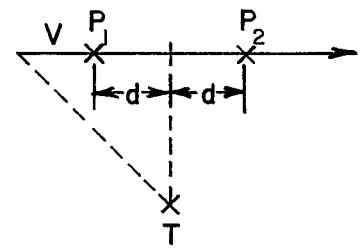
FIGS. 6 and 7 are graphic illustrations of a technique associated with the method of the present invention.

Referring now to FIG. 1 which is a standard doppler curve, this figure graphically depicts the standard doppler frequency curve observed for a stable transmitter frequency. FIG. 2 is a graphic illustration of a standard doppler curve obtained when two moving passive receivers are moved relative to the same active source, the transmitter frequency being stable. FIG. 3 is a graphic illustration of an ideal differential doppler curve obtained from a plot of the difference between doppler curves depicted in FIG. 2. FIG. 4 is a graphic illustration of the actual doppler curves obtained with two moving passive receivers, moving with respect to the same active source, when the transmitter frequency is unstable. FIG. 5 is the actual differential doppler curve obtained in the situation depicted in FIG. 4. FIG. 6 is a pictorial illustration of two passive receivers moving at the same speed in the same path at the time when they are equidistant from the transmitter. FIG. 7, as was previously explained, is a graphic illustration of the differential doppler geometry when two moving platforms are utilized.

In applying the method of the present invention, at least two passive receivers 21 are moved along a given measurement path of receiver movement, the actual path being unimportant, the only relevant factor being the location of the passive receivers at the points of measurement. The navigational information relative to the positional location of the passive receivers is obtained by any well known technique, such as LORAN systems. These passive receivers, which are tuned to the frequency of the active transmitter source to be located, receive doppler frequency shifts of the active source transmitter frequency as they move relative to the active transmitter source. At selected intervals along a given measurement path of receiver movement, this doppler frequency shift information is noted, as is the navigational information for the point of measurement. The difference of the doppler frequency shifts of each of these receivers, both receivers noting the doppler frequency shift and the navigational information at the same point in time, so an accurate comparison can be obtained, may be obtained in any well known manner, such as by phase detection.

The differential doppler is a constant for each point of measurement due to the fact that any frequency errors present in the signal will appear at both receivers and will cancel out when the differential of the doppler shifts is taken. This information is then processed in order to obtain the position of the active source, the processing being in accordance with the previously derived fade equations. These fade equations represent areas under the differential doppler curve between selected time intervals, as is illustrated in FIG. 5.

The navigational information and doppler frequency shift information which are received during the selected measurement intervals, as the passive receivers move along a measurement path relative to the active source, are obtained at the beginning point and termination point of each measurement interval, and, as previously mentioned, the information obtained at each of these points is independent of the path of movement taken between these points. It is, therefore, not necessary to move the passive receivers within a rigid corridor of movement, an action which is often difficult to maintain under ordinary circumstances. When the passive receivers are moved relative to the active source, a separation should be maintained between the passive receivers in order that there is truly a measurable difference in the doppler frequency shifts received at the passive receivers at any given interval of time. In order to maintain this separation, it is only necessary that it be significant relative to the distance to the active source, the separation being such that each receiver will experience a different doppler shift. This condition is desirable in order to achieve a maximum efficiency for the system.

The processing of the obtained navigational information and differential doppler information could readily be accomplished by data processing means associated with the passive receivers. One method of processing the received differential doppler frequency shift information would be by integrating the differential doppler with respect to time, the time integration points, or limits of integration, being determined by the selected measured intervals; for example, if the first measurement interval was during the time period $t_1$ to $t_2$, these would be the limits of integration. In the more general case, three distinct measurement intervals could be utilized in order to obtain the necessary information. These intervals $t_1-t_2$, $t_3-t_4$, and $t_5-t_6$, would yield sufficient information in order to obtain the unknown-three-dimensional-positional coordinates of the active source. If desired, a minimum of four time intervals could be utilized to obtain this information if the measurements were taken consecutively from $t_1$ to $t_2$, $t_2$ to $t_3$, $t_3$ to $t_4$. The difference of the received doppler frequency shifts could be obtained by the conventional method of phase detection, and if desired, this phase detection could be accomplished upon the passive receiver intermediate frequencies, in order to obtain the differential doppler. Integration of the differential doppler with respect to time is in accordance with the previously mentioned general expression $$\int_{t_1}^{t_2} F_d dt = \int_{t_1}^{t_2} F_1 dt - \int_{t_1}^{t_2} F_2 dt$$

where $t_1$ and $t_2$ represent the time at the beginning and termination points, respectively, of the selected measurement interval; $F_d$ represents the differential doppler obtained during the interval; and $F_1$, $F_2$, respectively, represent the doppler frequency shifts at the passive receivers during the measurement interval. This expression is the same for each measurement interval, the limits of integration merely changing.

FIG. 8 provides a visual representation of the claimed process. Receiver 30 of platform one and receiver 31 of platform two are each tuned to the frequency of the active transmitter source to be located. The doppler frequency shifts caused by the movement of the receivers varies over time as is indicated in FIG. 2. At selected intervals, represented in FIG. 5, the frequency shifts are noted, as indicated at 32 and 33 of FIG. 8. Phase detector 38 compares the doppler shifts to provide a differential doppler measurement. An integrator 39 integrates the differential doppler measurements over their respective time intervals to create the fade equations for $N_{12}$, $N_{34}$ and $N_{56}$ previously described.

LORAN receivers 42 and 43 obtain navigational data at each of the measurement points and this data is retained, as indicated by blocks 44 and 45. The navigational information X, Y, and Z (for platform one) and X', Y', and Z' (for platform two) at each of the measurement points is provided to a data processor 48, together with the output of integrator 39 over each of the measurement intervals. The three previously described fade equations are simultaneously solved by processor 48 for the three unknowns $X_o$, $Y_o$, and $Z_o$, the coordinates of the transmitter, as represented by block 49.

By applying the method of the present invention, an active source whose position is unknown can be located in a relatively simple manner with great accuracy. The accuracies of this system are enhanced by the fact that, by utilizing the method of the present invention, location of the active source is not dependent on distinguishing properties in modulation, nor on stability of the active transmitter source. Any conventional scheme for moving the passive receivers with respect to the active source may be utilized in the method of the present invention; such as locating each of the receivers on a separate airborne platform, as is illustrated in FIG. 7, or locating each of the receivers on separate seagoing craft, or any combination of these, the only consideration being the movement of at least one of the passive receivers relative to the active source.

It is to be understood that the above described embodiment of the invention is merely illustrative of the principles thereof and that numerous modifications and embodiments of the invention may be derived within the spirit and scope thereof, such as multiplexing the system so as to be able to locate a variety of active sources.

I claim:

1. A method of position fixing an active transmitter source comprising:
   moving at least two passive receivers along a given measurement path of receiver movement;
   obtaining navigational information during selected measurement intervals along the measurement path of movement, the navigational information indicating the positions of the receivers during the selected intervals;
   receiving doppler frequency shifts of the active source transmitter frequency, at the passive receivers during the selected intervals;
   obtaining the difference of the doppler frequency shifts received during the selected intervals, the differential doppler being a constant for each point of measurement during the selected intervals; and
   processing the obtained navigational and the received differential doppler frequency shifts to obtain the position of the active source.

2. A method in accordance with claim 1 wherein:
   the step of moving at least two passive receivers includes the step of moving the passive receivers relative to the active source.

3. A method in accordance with claim 2 wherein:
   the steps of obtaining navigational information and receiving doppler frequency shifts during selected measurement intervals includes the step of obtaining the frequency shift and navigational information at the beginning point and termination point of each measurement interval, the information obtained at each measurement point being independent of the path between the measurement points.

4. A method in accordance with claim 3 wherein:
   the step of moving the passive receivers relative to the active source includes the step of maintaining a separation between the passive receivers that is significant relative to the distance to the active source, the separation being such that each receiver will experience a different doppler shift.

5. A method in accordance with claim 4 wherein:
   the step of processing the received differential doppler frequency shifts includes the step of integrating the differential doppler with respect to time, the time integration points being determined by the selected measurement intervals.

6. A method in accordance with claim 5 wherein:
   the step of integrating the differential doppler with respect to time includes the step of integrating the differential doppler in accordance with the general expression:

$$\int_{t_1}^{t_2} F_d dt = \int_{t_1}^{t_2} F_1 dt - \int_{t_1}^{t_2} F_2 dt$$

where $t_1$ and $t_2$ represent the time at the beginning and termination points, respectively, of the selected measurement interval; $F_d$ represents the differential doppler obtained during the interval; and $F_1$, $F_2$ respectively, represent the doppler frequency shifts at the passive receivers during the measurement interval.

7. A method in accordance with claim 6 wherein:
   the step of processing the obtained navigational information and the received differential doppler frequency shifts to obtain the position of the active source includes the step of processing the navigational information and differential doppler frequency shift information for each measurement interval in accordance with the general expression, for a rectangular coordinate system of $$N_{12} = \lambda_t \int_{t_1}^{t_2} F_d dt =$$

$$\sqrt{(X_2 - X_0)^2 + (Y_2 - Y_0)^2 + (Z_2 - Z_0)^2} -$$

$$\sqrt{(X_1 - X_0)^2 + (Y_1 - Y_0)^2 + (Z_1 - Z_0)^2} -$$

$$\sqrt{(X'_2 - X_0)^2 + (Y'_2 - Y_0)^2 + (Z'_2 - Z_0)^2} +$$

$$\sqrt{(X'_1 - X_0)^2 + (Y'_1 - Y_0)^2 + (Z'_1 - Z_0)^2}$$

where $N_{12}$ represents the number of cycles of the active source signal received during the selected measurement interval; $\lambda_t$ represents the wavelength of the active source transmitted frequency, $X_1$, $Y_1$, and $Z_1$, and $X_2$, $Y_2$ and $Z_2$ represent the navigational positional information for the first passive receiver at the beginning and termination points, respectively, of the measurement interval; $X_1'$, $Y_1'$ and $Z_1'$, and $X_2'$, $Y_2'$ and $Z_2'$ represent the navigational positional information for the second passive receiver at the beginning and termination points, respectively, of the measurement interval; and $X_0$, $Y_0$ and $Z_0$ represent the rectangular coordinates of the position of the active source.

8. A method in accordance with claim 7 wherein:
   the steps of obtaining navigational information and receiving doppler frequency shifts further includes the step of obtaining the frequency shift and navigational information during at least two measurement intervals in order to obtain the position of the active source.

9. A method in accordance with claim 8 wherein:
   the step of obtaining the difference of the received doppler frequency shifts includes the step of phase detecting the passive receiver intermediate frequencies to obtain the differential doppler.

* * * * *